(12) United States Patent
Boss et al.

(10) Patent No.: US 10,956,117 B2
(45) Date of Patent: Mar. 23, 2021

(54) CONFERENCE SYSTEM VOLUME CONTROL

(71) Applicant: International Business Machines Corporation, Armonk, NY (US)

(72) Inventors: Gregory J. Boss, Saginaw, MI (US); Tamer E. Abuelsaad, Armonk, NY (US); John E. Moore, Jr., Pflugerville, TX (US); Randy A. Rendahl, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 16/209,289

(22) Filed: Dec. 4, 2018

(65) Prior Publication Data

US 2020/0174739 A1    Jun. 4, 2020

(51) Int. Cl.
| | |
|---|---|
| *G06F 3/16* | (2006.01) |
| *H04M 3/56* | (2006.01) |
| *G06F 16/908* | (2019.01) |
| *G10L 17/00* | (2013.01) |

(52) U.S. Cl.
CPC ............ *G06F 3/165* (2013.01); *G06F 16/908* (2019.01); *G10L 17/00* (2013.01); *H04M 3/561* (2013.01); *H04M 3/568* (2013.01)

(58) Field of Classification Search
None
See application file for complete search history.

(56) References Cited

U.S. PATENT DOCUMENTS

| | | |
|---|---|---|
| 6,501,739 B1 | 12/2002 | Cohen |
| 6,888,935 B1 | 5/2005 | Day |
| 7,933,226 B2 | 4/2011 | Woodruff et al. |
| 8,139,744 B2 | 3/2012 | Carlson et al. |
| 9,706,056 B2 | 7/2017 | Ohman et al. |
| 2003/0182001 A1 | 9/2003 | Radenkovic et al. |
| 2003/0231746 A1 | 12/2003 | Hunter et al. |
| 2006/0067500 A1 | 3/2006 | Christofferson et al. |
| 2008/0031437 A1 | 2/2008 | Rey |
| 2009/0094029 A1* | 4/2009 | Koch ............... H04M 3/42221 704/246 |
| 2016/0316064 A1* | 10/2016 | Ohman .................. H04M 3/568 |

* cited by examiner

*Primary Examiner* — Antim G Shah
(74) *Attorney, Agent, or Firm* — Schmeiser, Olsen & Watts, LLP; Brian Restauro

(57) ABSTRACT

A method, system and computer program product includes detecting a volume level for audio input of a first user in a multi-user conference call, and automatically adjusting a volume level for a second user receiving audio output of the first user based on at least one of preferences of the second user, historic data between the first and the second user, and geographic characteristics of the audio input of the first user.

17 Claims, 10 Drawing Sheets

CONFERENCE SYSTEM VOLUME CONTROL

TECHNICAL FIELD

The present invention relates to conferencing systems. More specifically, the invention relates to systems and methods for adjusting volumes and otherwise controlling conference volume in conference systems.

BACKGROUND

Conferencing system attendees typically call into a conference from various devices and use different microphones for receiving sound. Further, speaking attendees often speak with different vocal volumes. Because of the differences between voices, microphones, and distances from the microphone of speakers, attendees are typically delivered varying decibels of sound when attending a conference having multiple speakers. Attendees must either accept the volume differences between speakers or adjust the volume each time a new speaker begins to speak. Sometimes, accepting the volume difference is not possible, as speaking volume may be too low to hear or understand.

SUMMARY

An embodiment of the present invention relates to a method, and associated computer system and computer program product. One or more processors of a computer system detect a volume level for audio input of a first user in a multi-user conference call. A volume level for a second user receiving audio output of the first user is automatically adjusted based on at least one of preferences of the second user, historic data between the first and the second user, and geographic characteristics of the audio input of the first user.

DETAILED DESCRIPTION

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

The present invention seeks to improve conference call experiences for users by detecting, monitoring, controlling, and/or adjusting volume. The present invention teaches a system and method that determines or learns optimal volumes for audio output based on individual user preferences. The present invention seeks to reduce the need of manual volume changes by users in a multi-user conference call. The present invention proposes a system that automatically makes changes, or recommends changes to be made manually, that would make audio volumes more desirable to all users within the conference. It is recognized that existing art is deficient in that users are often faced with manually turning volumes up or down, depending on the speaker, particularly in multi-user conferences having different speaking users speaking at different volumes. The present invention provides for methods and systems that correct this problem by, on an individual user level, controlling audio volume according to user preferences.

Figure 1:
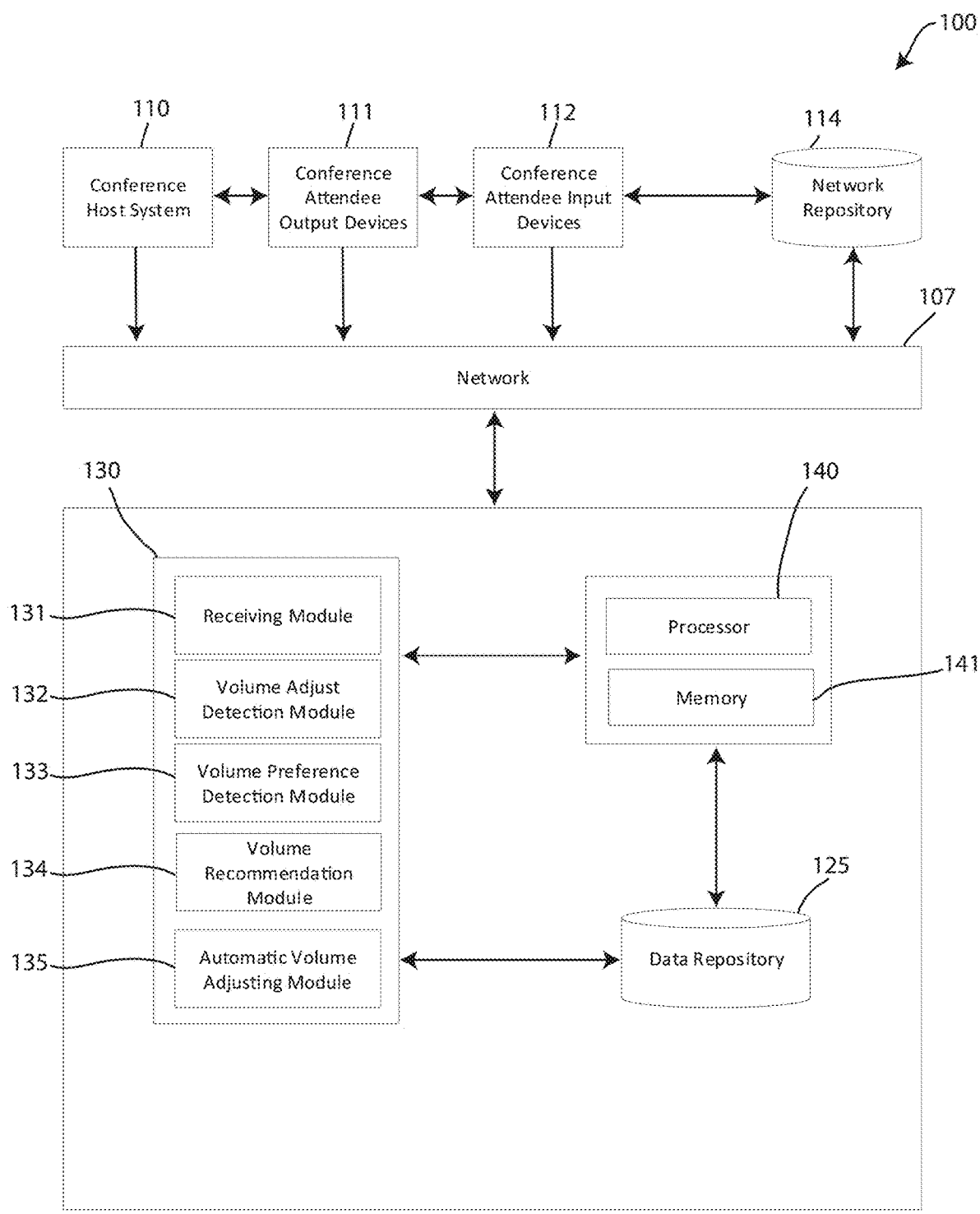
FIG. 1 depicts a block diagram of a system of conferencing with volume control, in accordance with embodiments of the present invention.

Referring to the drawings, FIG. 1 depicts a block diagram of a system of conferencing with volume control 100, in accordance with embodiments of the present invention. The system of conferencing with volume control 100 may be configured to automatically make adjustments or control audio automatically based on learned preferences of the various users. Embodiments of the system of conferencing with volume control 100 may be configured to detect volumes for individual users or lines attending a multi-user conference call. Embodiments of the system of conferencing with volume control 100 may be configured to monitor volumes for individual users or lines attending a multi-user conference call, and determine when a user is manually adjusting volumes. The system of conferencing with volume control 100 may be configured to make recommendations to speaking users to adjust volume settings for audio input. The system of conferencing with volume control 100 may be configured to develop an understanding of the relationships and interactions between known users attending a conference, and determine user-to-user preferences related to preferred audio volumes. Thus, the invention and the system of conferencing with volume control 100 is not limited to only controlling volume, and may be configured to provide any of the various functionality described herein. Hereinafter, a "conference call" may be any multi-attendee or multi-user conferencing experience, session, call and/or video experience.

The system of conferencing with volume control 100 is shown including a conference host system 110, conference attendee output devices 111, conference attendee input devices 112, and a network repository 114 connected over a network 107 to a computer system 120. Each of the conference host system 110, conference attendee output devices 111, conference attendee input devices 112, and the network repository 114 may represent a plurality or a single one of the given element 110, 111, 112, 114. Some or all of the conference host system 110, conference attendee output devices 111, conference attendee input devices 112, and the network repository 114 may be interconnected to others of these devices. While FIG. 1 shows the conference host system 110, conference attendee output devices 111, conference attendee input devices 112, and the network repository 114 directly connected to adjacent elements 110, 111, 112, 114, any interconnection (e.g. non-adjacent) of elements 110, 111, 112, 114 is contemplated. Further, while each of the elements 110, 111, 112, 114 are shown as separate features of the system of conferencing with volume control 100, in some embodiments one or more of the elements 110, 111, 112, 114 may be combined or contain overlapping structure and functionality (e.g. the conference host system 110 may include software located on conference attendee devices, or a conference attendee output device and input device may be a single device having both output and input capabilities).

The conference host system 110 may be a conference host system, platform or application for hosting a teleconference, a video conference, a web conference, or the like. The conference host system 110 may be configured to host live meetings, conferences, presentations and the like, via a TCP/IP internet connection. The conference host system 110 may be an online collaborative service. The conference host system 110 may be a browser based system where users access the conference host system 110 through a web browser on a user or attendee device. The conference host system 110 may host an application that must be downloaded by attendees or users using the conference host system 110 to host a conference call. The conference host system 110 may include the ability to live stream audio or video. The conference host system 110 may include voice over IP technology allowing for real time audio communication through a computer or other computing device. The conference host system 110 may support text or chat features, attendee surveys or the like. The conference host system 110 may require attendees to utilize specialized conference system hardware in order to attend a conference through the system.

The conference host system 110 may be configured to receive inputs from, and send outputs to, various types of conference attendee output devices 111 and conference attendee input devices 112. A conference attendee output device 111 may be any device configured to provide sound to a conference attendee, such as a device that includes a speaker. A conference attendee input device 112 may be any device that is configured to receive sound from a conference attendee, such as a device that includes a microphone. Many devices may include both input and output capabilities, such as telephones, webcams, headsets, mobile phones, tablets, laptops, and the like. The conference host system 110 may be configured to integrate with any type of attendee device.

The network repository 114 is a data collection area on the network 107 which may back up and save all the data transmitted back and forth between the nodes of the network 107. For example, the network repository 114 may be a data center saving and cataloging data sent between the nodes of the network 107. The network repository 114 uses this data to generate databases related to the information received. In some embodiments, a data collection center housing the network repository 114 may include an analytic module capable of analyzing each piece of data being stored by the network repository 114. Further, the computer system 120 may be integrated with or may be a component of the data collection center housing the network repository 114. In some alternative embodiments, the network repository 114 may be a local repository that is connected to the computer system 120.

The network 107 is any group of two or more computer systems linked together. The network 107 may represent, for example, the internet. The network 107 may be any type of computer network known by individuals skilled in the art. Examples of computer networks which may be embodied by the network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture. The computer system 120 is shown connected to the conference host system 110, conference attendee output devices 111, conference attendee input devices 112, and the network repository 114 via the network 107.

The computer system 120 is shown as a separate computer system from the conference host system 110 in the embodiment shown. However, in other embodiments, the computer system 120 may be owned, operated and/or controlled by the conference host system 110. Thus, the computer system 120 may be a system used and implemented by the conference host system 110 and integrated therein, or through a third-party service to which the conference host system 110 subscribes.

Embodiments of the computer system 120 is shown including a module structure 130 that includes a receiving module 131, volume adjust detection module 132, a volume preference detection module 133, a volume recommendation module 134, and an automatic volume adjusting module 135. A "module" herein refers to any hardware-based module, software-based module, or combination thereof. Embodiments of hardware-based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the receiving module 131 include one or more components of hardware and/or software program code for obtaining, retrieving, collecting, or otherwise receiving information from the conference host system 110, conference attendee output devices 111, conference attendee input devices 112, and the network repository 114. In an exemplary embodiment, the receiving module 131 is configured to receive information related to audio levels and manual adjustments made from users or attendees of conferences hosted by the conference host system. The receiving module 131 may be configured for receiving information related to user preferences from the user devices or the conference host system 110. The receiving module 131 may be configured for receiving information related to user settings, including device settings, geolocation information related to a user or line, or the like. The receiving module 131 provides information received by the computer system 120 from the conference host system 110, conference attendee output devices 111, conference attendee input devices 112, and the network repository 114 to be stored in a data repository 125 of the computer system 120, or directly to another memory location, such as memory 141 of the computer system 120.

Referring still to FIG. 1, embodiments of the computer system 120 shown further includes the volume adjust detection module 132. Embodiments of the volume adjust detection module 132 include one or more components of hardware and/or software program code configured for detecting a volume level for an audio input of users on a conference call. The volume adjust detection module 132 may further be configured to detect volume levels for audio output of users on a conference call. Still further, the volume adjust detection module 132 may be configured to detect adjustments or modifications made by users on a conference call to both input and output audio volume levels. For example, the volume adjust detection module 132 may be configured to detect an event where one or more users of a multi-user conference call are manually adjusting volume. The event may represent one listening user manually adjusting the output volume of audio on their output device. Alternatively, the event may represent a speaking user manually adjusting input volume for a microphone or other input device. The event may include any volume adjustment made by any user on a multi-user conference call. The volume adjust detection module 132 may be configured to store information related to a detected event. For example, the volume adjust detection module 132 may store the amount of adjustment made by a listening user, account information of the listening user doing the adjusting, location or IP address information related to the listening user doing the adjusting, the user speaking during the time that the listening user makes the adjustment, the location or IP address information related to the user speaking, device information related to input and output devices being used by the listening user and the speaking user, or the like. Thus, the volume adjust detection module 132 may be configured to associate any event with a user, account, line, or the like, that was currently speaking at the exact time of the event.

Referring still to FIG. 1, embodiments of the computer system 120 shown further includes a volume preference detection module 133. Embodiments of the volume preference detection module 133 include one or more components of hardware and/or software program code configured for identifying preferences of each user in a conference call. For example, the volume preference detection module 133 may be configured to match voice biometrics to each attendee, user, line, account or the like, that is attending a multi-user conference call. The volume preference detection module 133 may be configured to detect relationships between each user that is attending the multi-user conference call.

For example, a first user may have a difficult time understanding a second user, and may consistently turn up the volume relative to other users whenever the second user is speaking. As another example, the first user may have a difficult time understanding a third user whenever the third user is calling from a particular device that uses a particular voice input, and may consistently turn up the volume relative to other users whenever the third user is speaking on that particular device. In another example, the first user may always lower the volume whenever a fourth user is speaking. These relationships between users, their operating devices, the locations from which the users are conducting conference calls, and the like, may be analyzed and stored by the volume preference detection module 133. The amount, degree or number of volume increases or decreases associated with any volume adjustment (expressed on a numeric scale or as a percentage of max volume output) may further be stored with each user preference.

The volume preference detection module 133 may further be configured to predict a percentage of likelihood of a preference volume level for users based on previous interactions between users. For example, the volume preference detection module 133 may be configured to determine that there is a 90% chance that other users or attendees need to increase the volume of a line whenever a first user is on a multi-party conference call. Thus, the volume preference detection module 133 may predict various likelihoods of future events based on user preferences. The module structure 130 may utilize this preference information to make recommendations or automatic adjustments by the other modules 134, 135, as described herein below.

Referring still to FIG. 1, the computer system 120 further includes a volume recommendation module 134. Embodiments of the volume recommendation module 134 include one or more components of hardware and/or software program code configured for informing users when they are the target of an anomaly. For example, the volume recommendation module 134 may be configured to determine that a given user is always speaking whenever other users make volume adjustments. The volume recommendation module 134 may be configured to inform the user that they are the cause of such a volume anomaly. The volume recommendation module 134 may additionally or alternatively be configured to recommend to such a user to increase or decrease microphone input level. Such recommendations may reduce the number of manual volume changes required from all of the users in a multi-user conference. For example, if every user is speaking as a sufficient volume level, but one low speaking user is speaking at a reduced volume, rather than requiring all of the users to turn up their volume each time the low speaking user speaks, the system may inform the low speaking user that the system has determined that it would be beneficial if the low speaking user increases their microphone input level.

Referring still to FIG. 1, the computer system 120 further includes an automatic volume adjusting module 135. Embodiments of the automatic volume adjusting module 135 include one or more components of hardware and/or software program code configured to detect events that are similar to previous volume adjustment events. In those instances, the automatic volume adjusting module 135 may be configured to automatically adjust the volume of users appropriately. The automatic adjustment may be made in a consistent manner to that which was made manually by the users in the previous similar volume adjustment event. For example, if it was previously determined that a first user always increases the volume output the first time a second user is speaking, the next time the second user is speaking, the automatic volume adjusting module 135 may be configured to automatically adjust the output volume of the first user to the level at which the first user previously set the volume when the second user was speaking. Thus, the automatic volume adjusting module 135 may be configured to use the classifications of the volume preference detection module 133 to determine when historical events in a conference are similar to present events.

Referring still to FIG. 1, embodiments of the computer system 120 may be equipped a memory device 141 which may store information being used by the module structure 130 of the computer system 120. The computer system 120 may further be equipped with a processor 140 for implementing the tasks associated with the system of conferencing with volume control 100 and perform processing associated with the functionality of the module structure 130.

Figure 2:
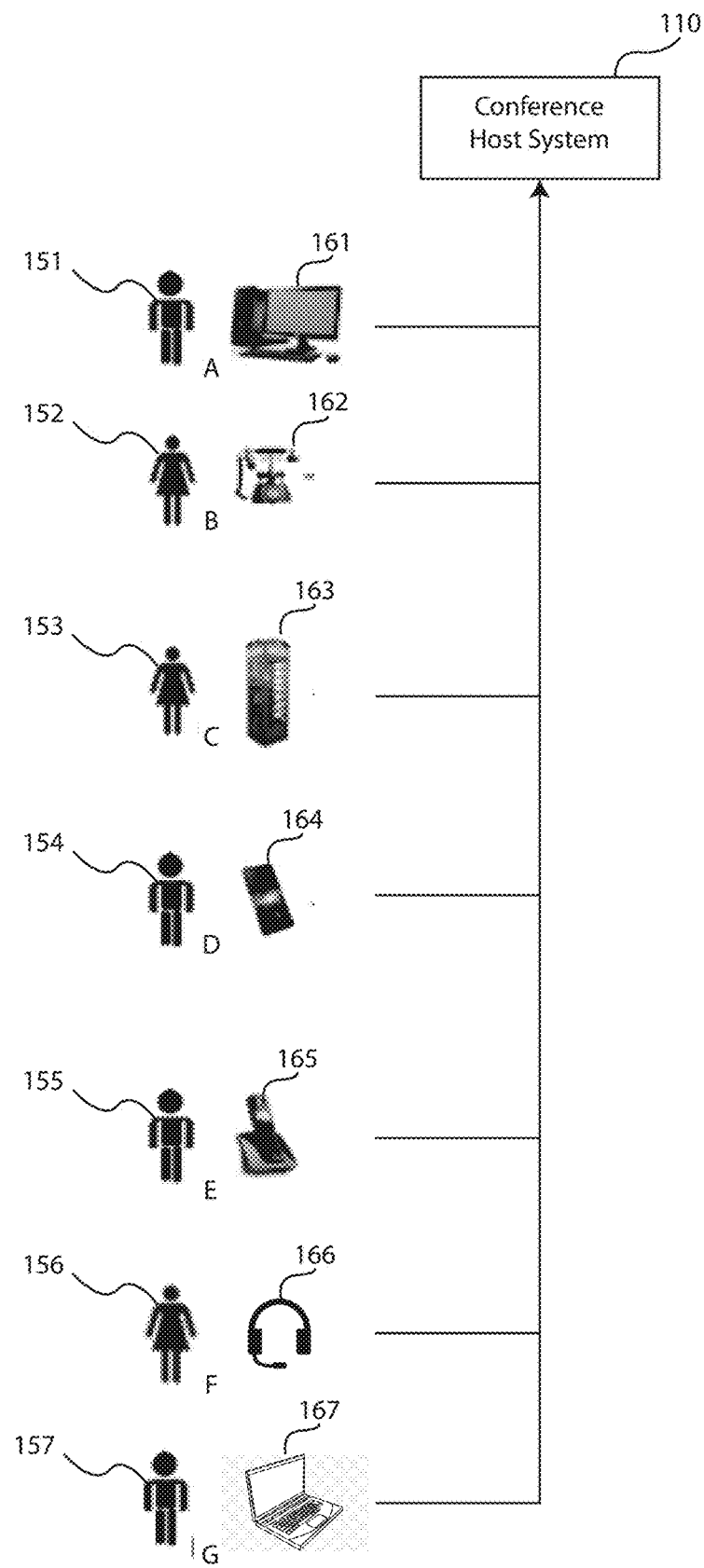
FIG. 2 depicts a conference host system of the system of conferencing with volume control and adjustment of FIG. 1 connected to users, in accordance with embodiments of the present invention.

FIG. 2 depicts a conference host system 110 of the system of conferencing with volume control 100 of FIG. 1 connected to users 151, 152, 153, 154, 155, 156, 157, in accordance with embodiments of the present invention. The conference host system 110 is shown receiving audio input from a first user 151 having a first user profile A, that is attending the conference using an attendee device that is a desktop computer. For example, a microphone may be built into a desktop computer screen or webcam, while the computer may include a desktop computer speaker system for outputting audio. A second user 152 having a second user profile B, that is attending the conference via a traditional rotary phone 162 that includes both an output and an input. A third user 153 having a third user profile C, is attending the conference using an attendee device that is a payphone 163. A fourth user 154 having a fourth user profile D, is attending the conference using an attendee device that is a mobile phone 164. A fifth user 155 having a fifth user profile E, is attending the conference using an attendee device that is a digital phone 165. A sixth user 156 having a sixth user profile F, is attending the conference using an attendee device that is a headset 166. A seventh user 157 having a seventh user profile G, is attending the conference using an attendee device that is a laptop computer 167. Each of these types of devices is connectable to the conference host system 110 as shown, and may be configured to provide inputs to the conference host system 110, and receive outputs from the conference host system 110 which are produced on the various devices 161, 162, 163, 164, 165, 166, 167 as sound.

The conference host system 110 may utilize the various module structure 130 described herein above to detect which users 151, 152, 153, 154, 155, 156, 157 attend. For example, the conference host system 110 may require the users to log into their respective user profiles A, B, C, D, E, F, G. The conference host system 110 may be configured to determine, using biometric information such as voice recognition, that the individual users 151, 152, 153, 154, 155, 156, 157 are attending the session under their own accounts. This may ensure that historic preferences for each user are appropriately applied during the conference session. In this embodiment, the conference host system 110 may be configured to detect the interrelationship between the users it has seen before in previous conferences to identify any user preferences for volume level.

Figure 3:
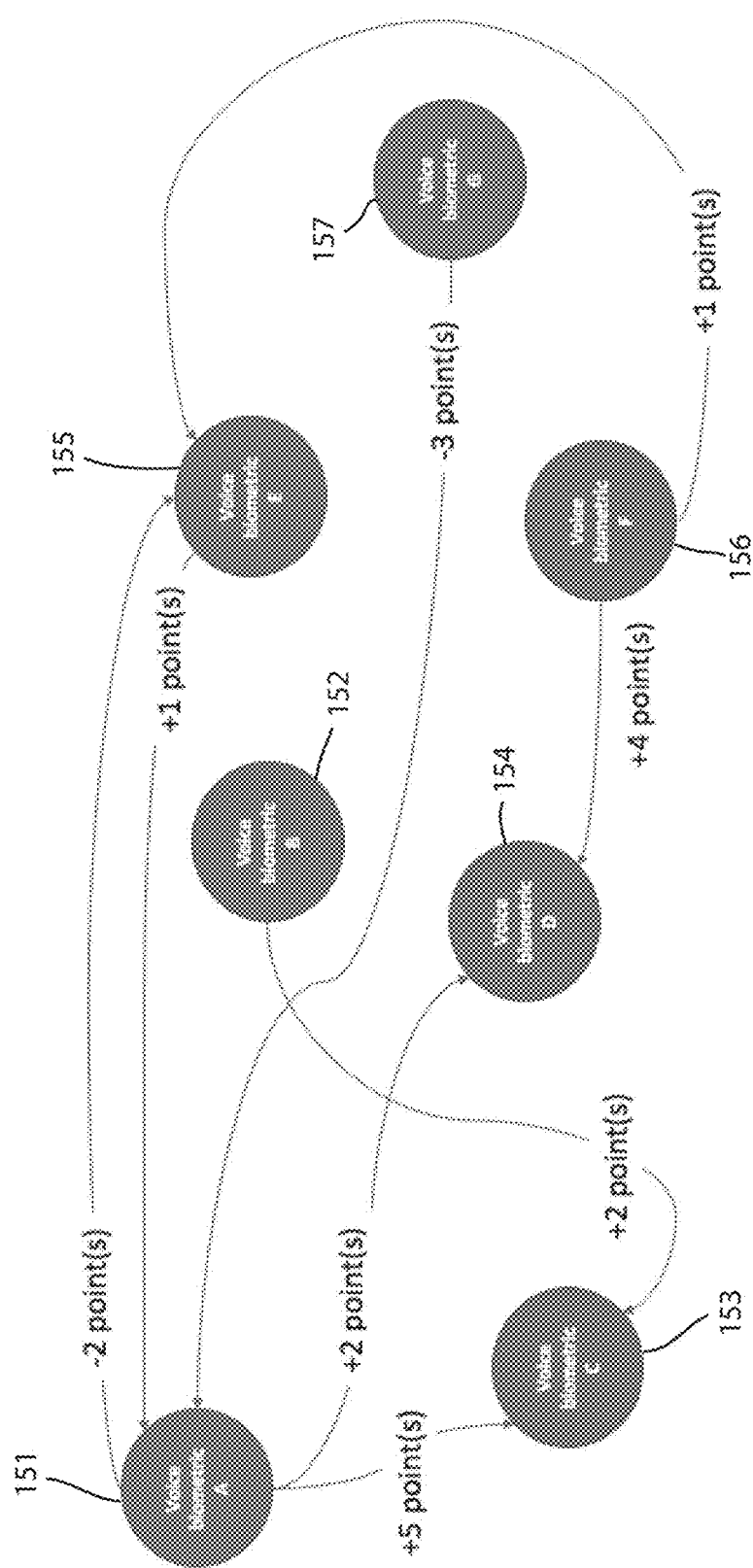
FIG. 3 depicts a relationship structure between the users of FIG. 2, in accordance with embodiments of the present invention.

FIG. 3 depicts a relationship structure between the users 151, 152, 153, 154, 155, 156, 157 of FIG. 2, in accordance with embodiments of the present invention. This relationship structure is an exemplary structure between the seven users 151, 152, 153, 154, 155, 156, 157 and associated user profiles A, B, C, D, E, F, G. The first user 151 having profile A is shown typically initiating three volume adjustments with three other users. In particular, the first user 151 reduces the volume by 2 points (a point representing any appropriate unit of measure and/or percentage of total volume) when listening to audio from the fifth user 155 (i.e. when the fifth user 155 is talking). Likewise, the first user 151 increases the volume by two points when listening to the audio from the fourth user 154, and increases the volume by five points when listening to the audio from the third user 153. The second user 152 increases the volume output by 2 points when listening to audio from the third user 153. The third user 153 and the fourth user 154 make no changes when listening to audio from the other users. The fifth user 155 increases the volume by one point when listening to audio from the first user 151. The sixth user 156 increases the volume by four points when listening to audio from the fourth user 154, and increases the volume by 1 point when listening to audio from the fifth user 155. Finally, the seventh user 157 reduces the volume by 3 points when listening to the audio from the first user 151. These volume changes may be calculated by the module structure 130 over time and continually updated based on any new information or manual inputs provided to the computer system 120 from the users. These volume changes may be the volume changes determined by the computer system 120 and/or the module structure 130 to result in the highest probability of user satisfaction, as described herein above.

The conference host system 110 may account for the geo location, devices used by individual users, or the like, when creating a database filled with these interrelationships. For example, the relationships shown in FIG. 3 may represent each user's preferred relationships when the users are using their preferred devices 161, 162, 163, 164, 165, 166, 167 as shown in FIG. 2. However, if the fourth user switches from the mobile device 164, to a digital phone, the computer system 120 may determine that the user device is different and modify or apply new settings that are device specific. These modified preferences may change the other users preferences as well. For example, the first and sixth users 151, 156 are each shown in FIG. 3 to require an increase in volume when the fourth user 154 is using the preferred mobile device 164. However, if the fourth user 154 switches to the digital phone, the first and sixth users 151, 156 may no longer require a volume adjustment when listening to audio from the fourth user 154. The computer system 120 and module structure 130 may account for these types of changes, store data, and develop interrelations between users, that are device dependent, location dependent, or dependent on other factors.

Figure 4:
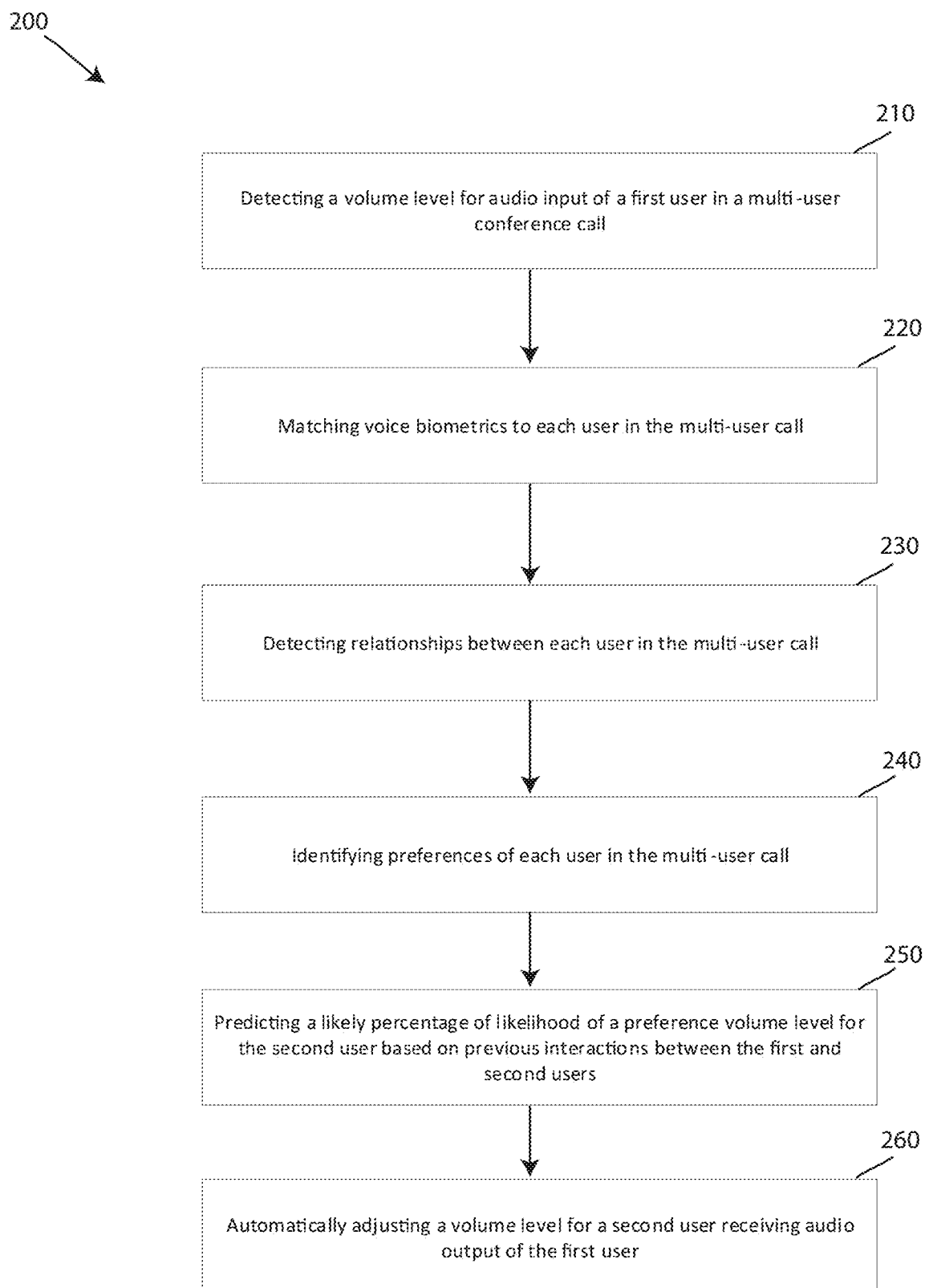
FIG. 4 depicts a flow chart of a method of controlling volume of a conferencing system, in accordance with embodiments of the present invention.

FIG. 4 depicts a flow chart of a method 200 of controlling volume of a conferencing system, in accordance with embodiments of the present invention. The method 200 includes a first step 210 of detecting a volume level for audio input of a first user in a multi-user conference call. The method 200 includes a second step 220 of matching voice biometrics to each of the users in the multi-user call to ensure that any stored preferences are applicable. The method 200 may further include determining which device the users are operating on, where the users are operating from, and various other potential factors that might influence preferences. The method 200 then includes a step 230 of detecting relationships between each user in the multi-user call. This step 230 may be accomplished after the location, device or other variables are determined by the system and the preference database information matches those variables. The step of detecting relationships 230 may be continually performed during any conference call monitored by the system of conferencing with volume control 100. The step 230 may be accomplished on previous calls from a current call. The method 200 includes a step 240 of identifying preferences of each user in the multi-user call. The method 200 then includes a step 250 of predicting a percentage of likelihood of a preference volume level for a second user based on previous interactions between the first and second users. The method 200 then includes a step 260 of automatically adjusting a volume level for a second user receiving an audio output from the first user. This automatic adjusting from step 260 may be based on the preferences of the second user, historic data between the first and the second user, and/or geographic characteristics of the audio input of the first user, for example.

Figure 5:
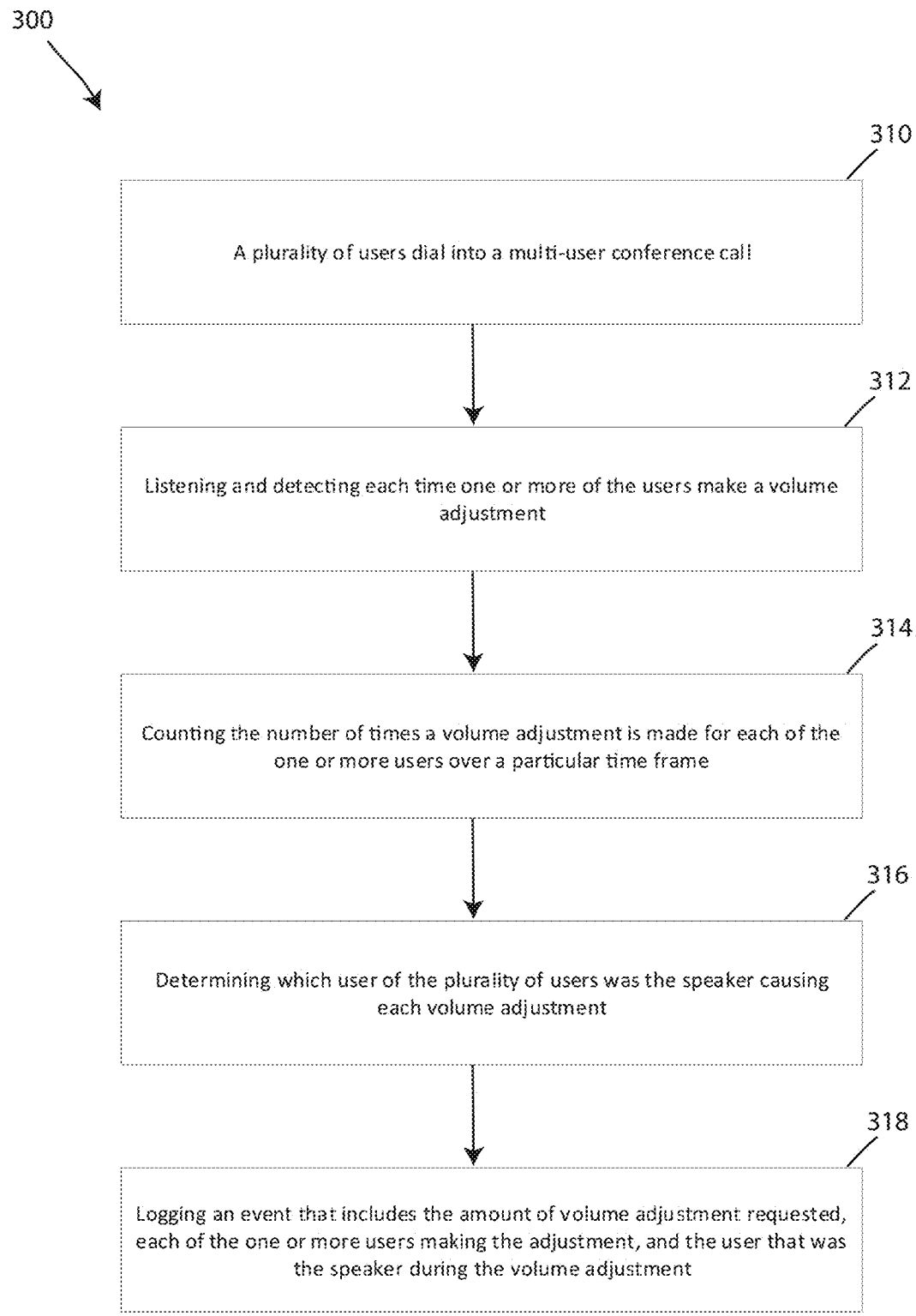
FIG. 5 depicts a flow chart of another method of controlling volume of a conferencing system, in accordance with embodiments of the present invention.

FIG. 5 depicts a flow chart of another method 300 of controlling volume of a conferencing system, in accordance with embodiments of the present invention. The method 300 includes a first step 310 of having a plurality of users dial into a multi-user conference call. The method 300 includes a second step 312 of listening and detecting each time one or more of the users make a volume adjustment. The method 300 includes a third step 314 of counting the number of times a volume adjustment is made for each of the one or more users over a particular predetermined time frame or period. The method 300 includes a fourth step 316 of determining which user of the plurality of users was the speaker causing each volume adjustment. The method 300 includes a fifth step 318 of logging an event that includes the amount of volume adjustment requested by each user, logging each of the users making the adjustment, and logging the user that was the speaker during the volume adjustment. This log may be saved in a data repository, such as for example the data repository 125.

Figure 6:
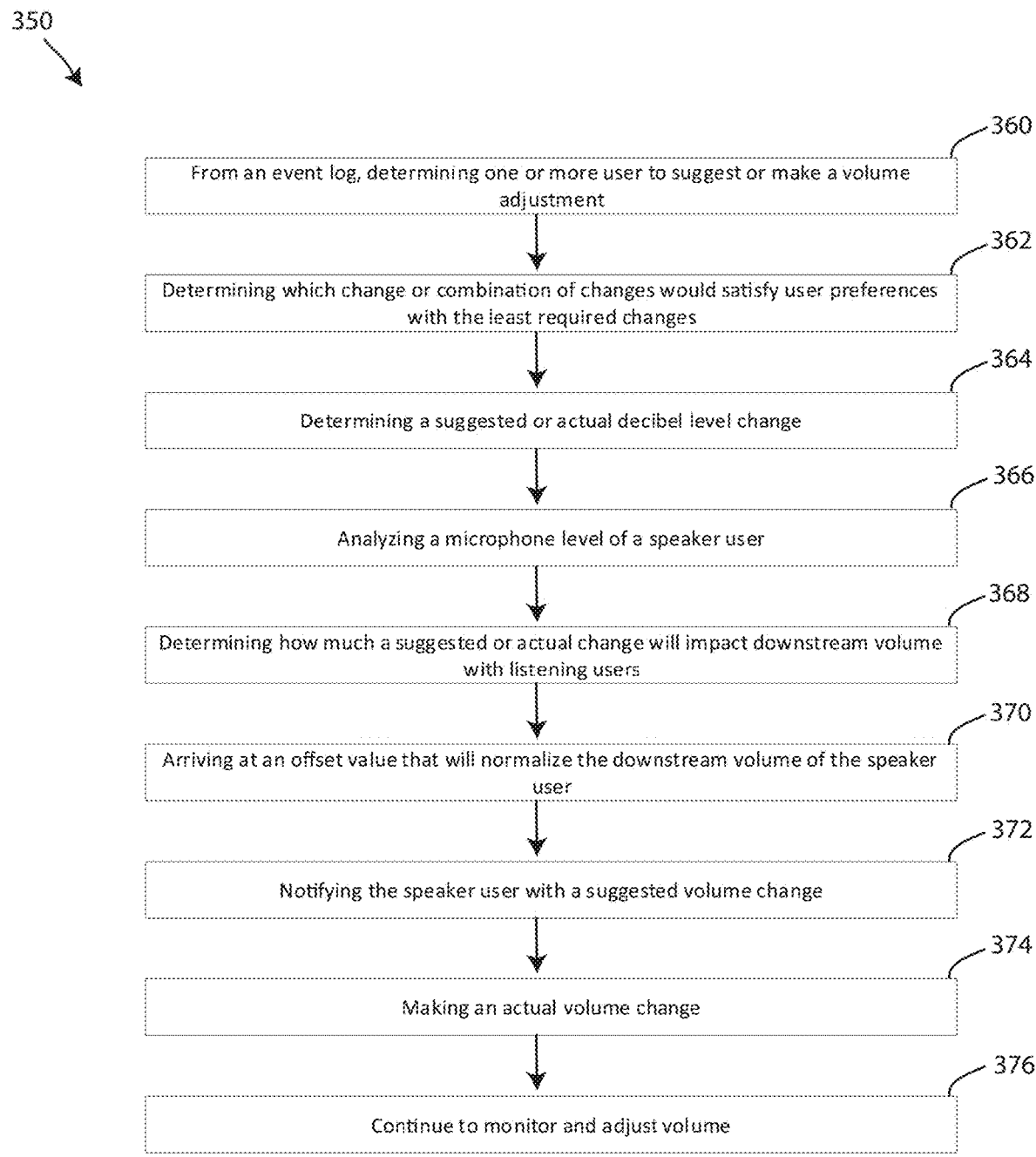
FIG. 6 depicts a flow chart of another method of controlling volume of a conferencing system, in accordance with embodiments of the present invention.

FIG. 6 depicts a flow chart of another method 350 of controlling volume of a conferencing system, in accordance with embodiments of the present invention. The method 350 includes a step 360 of determining, from an event log, one or more users to suggest or make a volume adjustment. The method 350 includes a step 362 of determining which change, or combination of changes, would satisfy user preferences with the least required additional changes. The method 350 includes a step 364 of determining a suggested or actual decibel level change. The method 350 includes a step 366 of analyzing a microphone level of a speaker user. The method 350 includes a step 368 of determining how much a suggested or actual change would impact downstream volume with listening users. The method 350 includes a step 370 of arriving at an offset value that will normalize the downstream volume of the speaker user for the listening users. The method 350 includes a step 372 of notifying the speaker user with a suggested volume change so that the speaker may manually change the volume. The method 350 includes a step 374 of making an actual volume change automatically for the listening or speaking users. Step 374 may be completed automatically without human intervention or approval. The method 350 includes a step 376 of continuing to monitor and adjust the volume, or recommend a volume adjustment, as needed to accommodate for user preferences.

Figure 7:
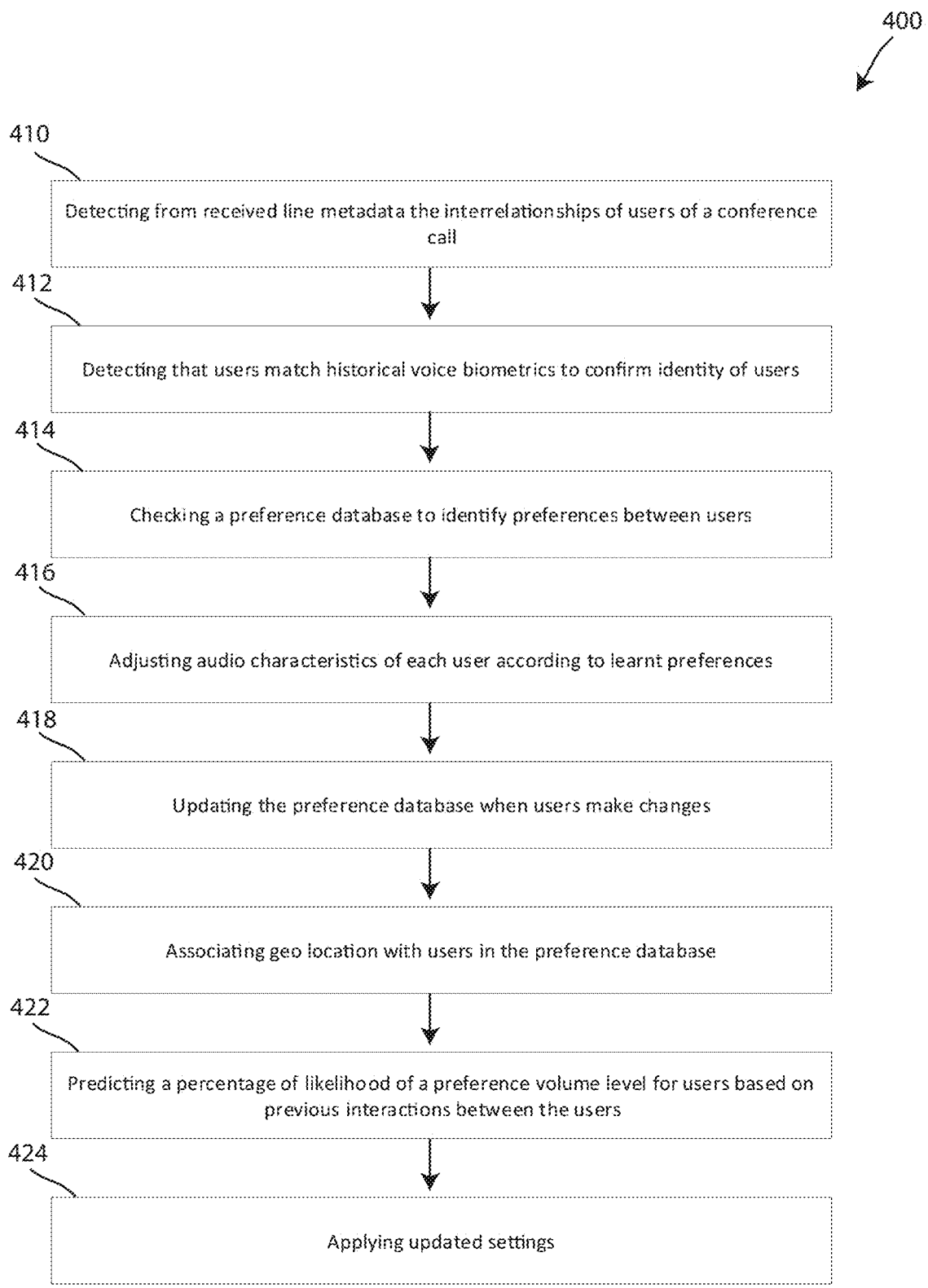
FIG. 7 depicts a flow chart of another method of controlling volume of a conferencing system, in accordance with embodiments of the present invention.

FIG. 7 depicts a flow chart of another method 400 of controlling volume of a conferencing system, in accordance with embodiments of the present invention. The method 400 includes a step 410 of detecting from received line metadata the interrelationships of users of a conference call. The metadata may provide information as to which users are on the call, which devices they are calling from, and where the users are located. The method 400 includes a step 412 of detecting that users match historical voice biometrics on record to confirm the identity of the users. The method 400 includes a step 414 of checking a preference database to identify preferences between users. The method 400 includes a step 416 of adjusting audio characteristics of each user according to learnt preferences. The method 400 includes a step 418 of updating the preference database when users make preference changes, or changes to other variables that impact preferences (change devices, locations, etc.). The method 400 includes a step 420 of associating geo location with users in the preference database. The method 400 includes a step 422 of predicting a percentage likelihood of a preference volume level for users based on previous interactions between users. The method 400 includes a step 424 of applying updated settings, which may be based on the determined percentage likelihood.

The practical applications described hereinabove and shown in FIGS. 2-3, along with the accompanying practical applications embodied by the methods shown in FIGS. 4-7 are meant to be exemplary and display various different embodiments for automatically controlling the volume levels of a conference call based on user preferences learned by a computer system, such as the computer system 120, from manual inputs from users over time that are tracked, stored, and analyzed by the computer system. The computer system thus may be configured to track these preferences, associate them with settings applicable to users, and make predictions from this historical information as to what audio level a user would prefer in a given situation. Embodiments of the invention thus include various forms of detecting audio preferences between users of a conference call system, making suggestions from these audio preferences to users attending a conference call, and automatically changing audio settings based on predicted preferred settings. The invention thus solves the real practical and technical problem of users being required to manually adjust volume settings back and forth throughout a conference call whenever a new user, speaking with a different volume, begins to present or speak in the conference.

Figure 8:
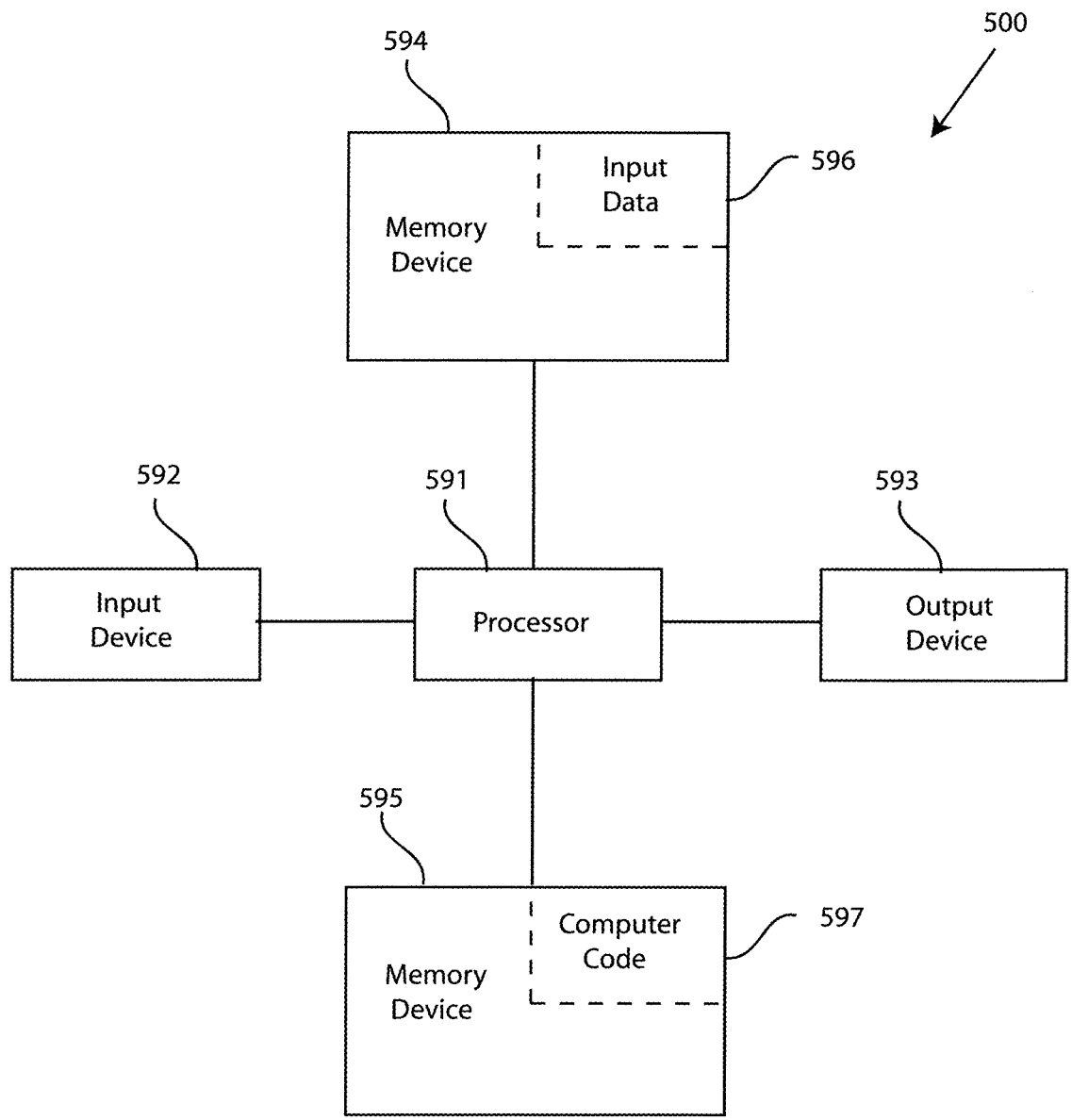
FIG. 8 depicts a block diagram of a computer system of the system of conferencing with volume control of FIG. 1, capable of implementing methods of controlling volume in a conference system in FIGS. 4-7, in accordance with embodiments of the present invention.

FIG. 8 illustrates a block diagram of a computer system that may representative of any computer or computer system within the system of conferencing with volume control 100 of FIG. 1, capable of implementing methods of conferencing with volume control of FIGS. 4-7, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method of conferencing with volume control, in the manner prescribed by the embodiments of FIGS. 4-7 using the system of conferencing with volume control 100 of FIG. 1, wherein the instructions of the computer code 597 may be executed by processor 591 via memory device 595. The computer code 597 may include software or program instructions that may implement one or more algorithms for implementing the methods of conferencing with volume control, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 8.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer system 500, and may include any type of transmission link, including electrical, optical, wireless, etc.

An I/O interface may allow computer system 500 to store information (e.g., data or program instructions such as computer code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and methods of conferencing with volume control. Thus, an embodiment of the present invention discloses a process for supporting computer infrastructure, where the process includes providing at least one support service for at least one of integrating, hosting, maintaining and deploying computer-readable code (e.g., computer code 597) in a computer system (e.g., computer system 500) including one or more processor(s) 591, wherein the processors) carry out instructions contained in the computer code 597 causing the computer system to provide a system of conferencing with volume control. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method of conferencing with volume control. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method of conferencing with volume control.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computer resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models areas follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
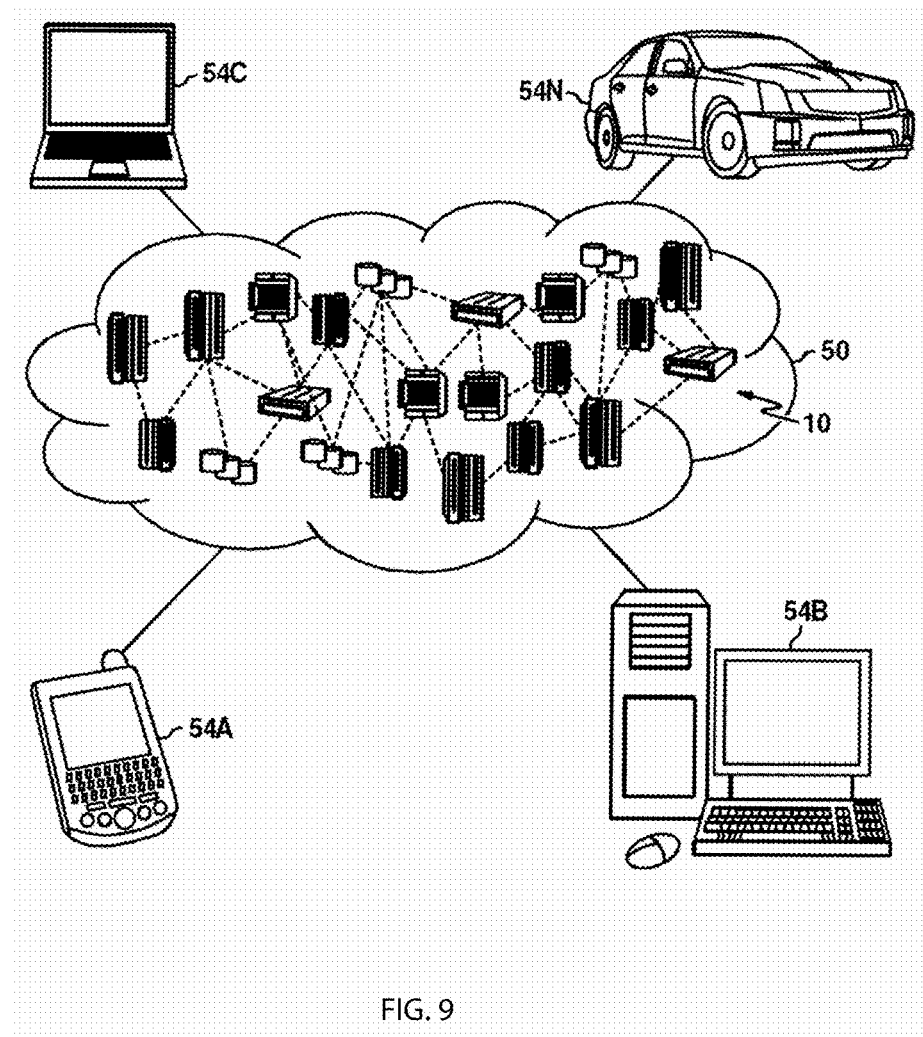
FIG. 9 depicts a cloud computing environment, in accordance with embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 9 are intended to be illustrative only and that computing nodes 10 and cloud computing environment 50 can communicate with any type of computerized device over any type of network and/or network addressable connection (e.g., using a web browser).

Figure 10:
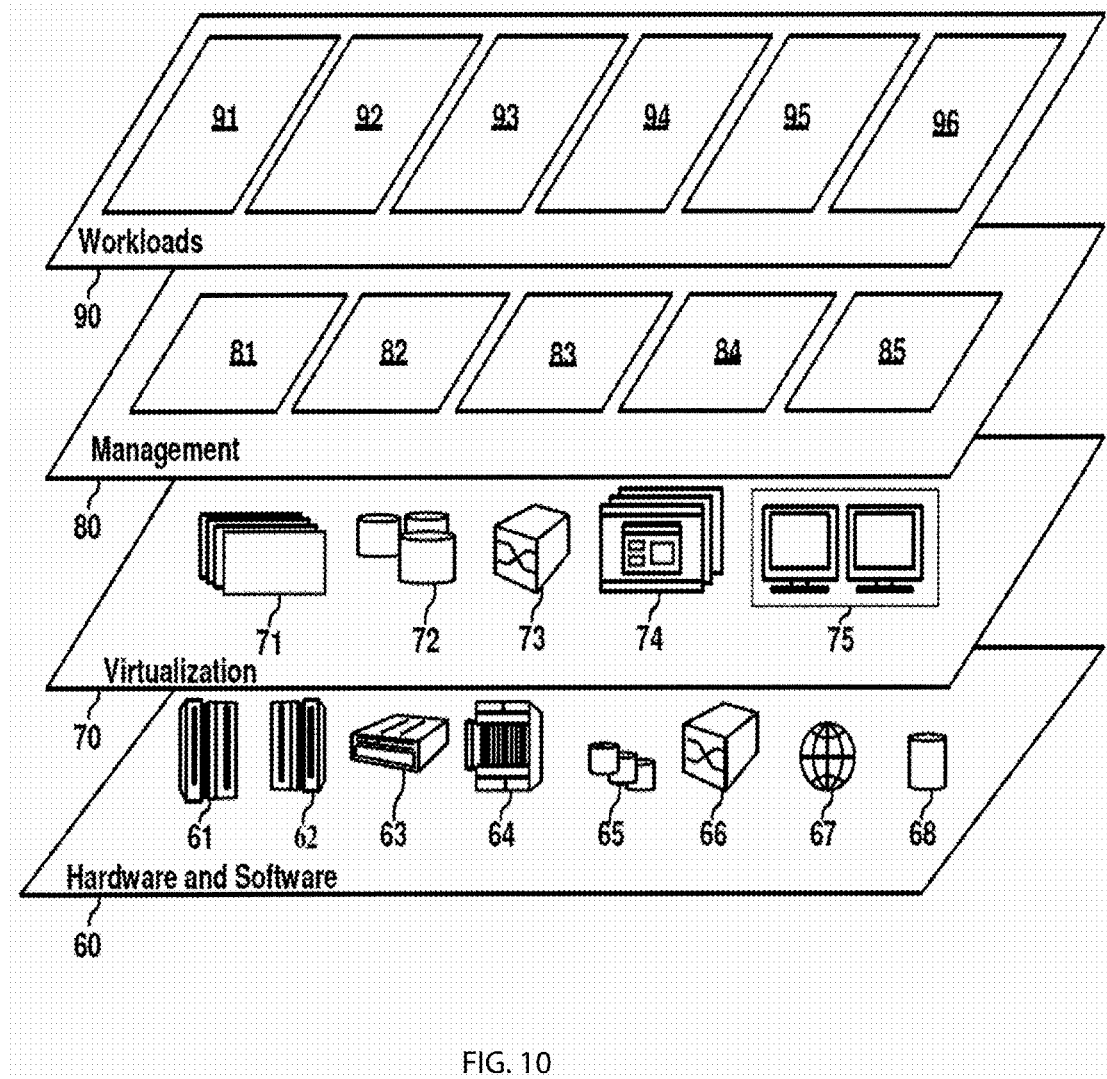
FIG. 10 depicts abstraction model layers, in accordance with embodiments of the present invention.

Referring now to FIG. 10, a set of functional abstraction layers provided by cloud computing environment 50 (see FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing related to conferencing with volume control 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    detecting, by one or more processors of a computer system, a manual volume level adjustment by a first user of a conference host system in a multi-user conference call;
    associating, by the one or more processors of the computer system, the manual volume level adjustment with a second user;
    matching, by the one or more processors of the computer system, voice biometrics to the first and second users in the multi-user conference call; and
    detecting, by the one or more processors of the computer system, relationships between the first and second users of the multi-user conference call;
    predicting, by the one or more processors of the computer system, a preference volume level for the first user based on the detected relationships and previous interactions between the first user and the second user including the detected manual audio level adjustment; and
    automatically adjusting, by the one or more processors of the computer system, a volume level to the predicted preference volume level for the first user based on the detected relationships and the historic data between the first and the second user including the detected manual audio level adjustment.

2. The method of claim 1, further comprising:
    identifying, by the one or more processors of the computer system, preferences of each user in the multi-user conference call.

3. The method of claim 1, wherein the automatically adjusting the volume level for the second user receiving audio output of the first user further comprises:
    predicting, by the one or more processors of the computer system, a percentage of likelihood of a preference volume level for the second user based on previous interactions between the first user and the second user.

4. The method of claim 1, wherein the multi-user conference call during the manual volume level adjustment is a previous call and wherein the automatically adjusting the volume level to the predicted preference volume level occurs on a current call.

5. The method of claim 4, further comprising:
    informing, by the one or more processors of the computer system after the associating the first event with the target user, the target user that the target user is the cause of a volume anomaly; and
    recommending, by the one or more processors of the computer system, the target user to increase or decrease microphone input level.

6. The method of claim 4, further comprising:
    detecting, by the one or more processors of the computer system, a second event that is similar or the same as the event;
    automatically adjusting, by the one or more processors of the computer system, the volume of the one or more users of the multi-user conference call in a consistent manner to adjustments made by the one or more users of the multi-user conference call during the first event.

7. A computer system, comprising:
    one or more processors;
    one or more memory devices coupled to the one or more processors; and
    one or more computer readable storage devices coupled to the one or more processors, wherein the one or more storage devices contain program code executable by the one or more processors via the one or more memory devices to implement a method, the method comprising:
    detecting, by the one or more processors of the computer system, a manual volume level adjustment by a first user of a conference host system in a multi-user conference call;
    associating, by the one or more processors of the computer system, the manual volume level adjustment with a second user;
    matching, by the one or more processors of the computer system, voice biometrics to the first and second users in the multi-user conference call; and
    detecting, by the one or more processors of the computer system, relationships between the first and second users of the multi-user conference call;
    predicting, by the one or more processors of the computer system, a preference volume level for the first user based on the detected relationships and previous interactions between the first user and the second user including the detected manual audio level adjustment; and
    automatically adjusting, by the one or more processors of the computer system, a volume level to the predicted preference volume level for the first user based on the detected relationships and the historic data between the first and the second user including the detected manual audio level adjustment.

8. The computer system of claim 7, the method further comprising:
    identifying, by the one or more processors of the computer system, preferences of each user in the multi-user conference call.

9. The computer system of claim 7, wherein the automatically adjusting the volume level for the second user receiving audio output of the first user further comprises:
    predicting, by the one or more processors of the computer system, a percentage of likelihood of a preference volume level for the second user based on previous interactions between the first user and the second user.

10. The computer system of claim 7, wherein the multi-user conference call during the manual volume level adjustment is a previous call and wherein the automatically adjusting the volume level to the predicted preference volume level occurs on a current call.

11. The computer system of claim 10, the method further comprising:
    informing, by the one or more processors of the computer system after the associating the first event with the target user, the target user that the target user is the cause of a volume anomaly; and
    recommending, by the one or more processors of the computer system, the target user to increase or decrease microphone input level.

12. The computer system of claim 10, the method further comprising:

detecting, by the one or more processors of the computer system, a second event that is similar or the same as the event;

automatically adjusting, by the one or more processors of the computer system, the volume of the one or more users of the multi-user conference call in a consistent manner to adjustments made by the one or more users of the multi-user conference call during the first event.

13. A computer program product, comprising a computer readable hardware storage device storing a computer readable program code, the computer readable program code comprising an algorithm that when executed by one or more processors of a computer system implements a method, the method comprising:

detecting, by the one or more processors of the computer system, a manual volume level adjustment by a first user of a conference host system in a multi-user conference call;

associating, by the one or more processors of the computer system, the manual volume level adjustment with a second user;

matching, by the one or more processors of the computer system, voice biometrics to the first and second users in the multi-user conference call; and detecting, by the one or more processors of the computer system, relationships between the first and second users of the multi-user conference call;

predicting, by the one or more processors of the computer system, a preference volume level for the first user based on the detected relationships and previous interactions between the first user and the second user including the detected manual audio level adjustment; and automatically adjusting, by the one or more processors of the computer system, a volume level to the predicted preference volume level for the first user based on the detected relationships and the historic data between the first and the second user including the detected manual audio level adjustment.

14. The computer program product of claim 13, the method further comprising:

identifying, by the one or more processors of the computer system, preferences of each user in the multi-user conference call.

15. The computer program product of claim 13, wherein the multi-user conference call during the manual volume level adjustment is a previous call and wherein the automatically adjusting the volume level to the predicted preference volume level occurs on a current call.

16. The computer program product of claim 14, the method further comprising:

informing, by the one or more processors of the computer system after the associating the first event with the target user, the target user that the target user is the cause of a volume anomaly; and recommending, by the one or more processors of the computer system, the target user to increase or decrease microphone input level.

17. The computer program product of claim 14, the method further comprising:

detecting, by the one or more processors of the computer system, a second event that is similar or the same as the event;

automatically adjusting, by the one or more processors of the computer system, the volume of the one or more users of the multi-user conference call in a consistent manner to adjustments made by the one or more users of the multi-user conference call during the first event.

\* \* \* \* \*